United States Patent
Kim et al.

(10) Patent No.: US 8,040,457 B2
(45) Date of Patent: Oct. 18, 2011

(54) SIDE MOLD, BACKLIGHT ASSEMBLY HAVING THE SAME, METHOD THEREOF, AND LIQUID CRYSTAL DISPLAY HAVING THE BACKLIGHT ASSEMBLY

(75) Inventors: Jung-ki Kim, Suwon-si (KR); Jae-hwan Chun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 664 days.

(21) Appl. No.: 11/831,085

(22) Filed: Jul. 31, 2007

(65) Prior Publication Data
US 2008/0030641 A1 Feb. 7, 2008

(30) Foreign Application Priority Data
Aug. 1, 2006 (KR) .................. 10-2006-0072755

(51) Int. Cl.
*G02F 1/1335* (2006.01)
*G09F 13/04* (2006.01)
*G09F 13/08* (2006.01)
(52) U.S. Cl. .................. 349/61; 349/70; 362/97.2
(58) Field of Classification Search .............. 362/97.2
See application file for complete search history.

(56) References Cited

U.S. PATENT DOCUMENTS

| | | |
|---|---|---|
| 2003/0231512 A1 | 12/2003 | Bang et al. |
| 2005/0063170 A1 * | 3/2005 | Lee et al. .................. 362/31 |
| 2005/0243571 A1 | 11/2005 | Kang et al. |
| 2005/0276074 A1 | 12/2005 | Ryu |
| 2006/0050518 A1 | 3/2006 | Ko et al. |
| 2006/0103774 A1 * | 5/2006 | Han et al. .................. 349/58 |
| 2006/0146512 A1 * | 7/2006 | Choi .................. 362/29 |
| 2007/0153496 A1 * | 7/2007 | Chang et al. .................. 362/97 |

FOREIGN PATENT DOCUMENTS

| | | |
|---|---|---|
| KR | 1020010046232 | 6/2001 |
| KR | 1020050011143 | 1/2005 |
| KR | 1020060019653 | 3/2006 |

OTHER PUBLICATIONS

European Search Report dated Jan. 4, 2008; Application No. 07014739.2-2205 (All references cited in search report are listed above).

\* cited by examiner

*Primary Examiner* — Uyen Chau N Le
*Assistant Examiner* — John M Bedtelyon
(74) *Attorney, Agent, or Firm* — Cantor Colburn LLP

(57) ABSTRACT

A backlight assembly having lamp sockets and a side mold is provided. The backlight assembly includes a lamp emitting light, a lamp socket into which the lamp is inserted, and a side mold having at least one portion of a bottom surface thereof opened and including a supporting portion, a side wall formed at one side of the supporting portion, a sloping portion inclined downwardly at a side opposite to the supporting portion, and at least one socket connection portion receiving the lamp socket.

16 Claims, 21 Drawing Sheets

SIDE MOLD, BACKLIGHT ASSEMBLY HAVING THE SAME, METHOD THEREOF, AND LIQUID CRYSTAL DISPLAY HAVING THE BACKLIGHT ASSEMBLY

This application claims priority to Korean Patent Application No. 10-2006-0072755, filed on Aug. 1, 2006, and all the benefits accruing therefrom under 35 U.S.C. §119, the contents of which in its entirety are herein incorporated by reference.

BACKGROUND OF THE INVENTION

1. Field of the Invention

The present invention relates to a side mold, a backlight assembly having the same, a method thereof, and a liquid crystal display ("LCD") having the backlight assembly, and more particularly, to a backlight assembly having a lamp socket and a side mold, a method of assembling the backlight assembly, an LCD having the backlight assembly, and a side mold included in the backlight assembly.

2. Description of the Related Art

A liquid crystal display ("LCD") includes an LCD panel having two substrates having a plurality of electrodes thereon and a liquid crystal layer interposed there between and controls the transmittance of incident light by applying voltages to the electrodes to rearrange liquid crystal molecules of the liquid crystal layer. A backlight assembly supplying the LCD panel with light is disposed below the LCD panel. The backlight assembly is classified into an edge-type and a direct-type according to the position of a light source within the backlight assembly. In an edge-type backlight assembly, a plurality of lamps used as the light source are arranged at lateral sides of a bottom chassis. In a direct-type backlight assembly, a plurality of lamps used as the light source are arranged on the bottom surface of a bottom chassis.

In the direct-type backlight assembly, the plurality of lamps are inserted into corresponding lamp sockets so as to be engaged with the bottom chassis. A side mold covers the top surface of the lamp sockets into which the plurality of lamps are inserted. Some of the lamp sockets protrude toward the rear surface of the bottom chassis to be electrically connected with a power supply.

Since the lamp sockets are separate from one another, their positions may fluctuate randomly, which impairs structural stability of the backlight assembly. In addition, the work of inserting the lamps into the respective lamp sockets should be accurately controlled, leading to an increase in time required for assembly.

BRIEF SUMMARY OF THE INVENTION

The present invention provides a backlight assembly having a lamp socket without additional components.

The present invention also provides a simplified method of assembling a backlight assembly.

The present invention also provides a liquid crystal display ("LCD") having the backlight assembly.

The present invention also provides a side mold capable of being combined with a lamp socket without additional components.

These and other aspects of the present invention will be described in or be apparent from the following description of the preferred embodiments.

According to exemplary embodiments of the present invention, there is provided a backlight assembly including a lamp emitting light, a lamp socket into which the lamp is inserted, and a side mold having at least one portion of a bottom surface thereof opened and including a supporting portion, a side wall formed at one side of the supporting portion, a sloping portion inclined downwardly at a side opposite to the supporting portion, and at least one socket connection portion receiving the lamp socket.

According to other exemplary embodiments of the present invention, there is provided a backlight assembly including a lamp emitting light, a lamp socket into which the lamp is inserted, a side mold having at least one portion of a bottom surface thereof opened and including a supporting portion, a side wall formed at one side of the supporting portion, and a sloping portion inclined downwardly at a side opposite to the supporting portion, and a socket connection plate having a support plate and at least one socket connection portion formed on the support plate and receiving the lamp socket, the socket connection plate housed inside an internal space of the side mold defined by the bottom surface, the side wall, the supporting portion, and the sloping portion of the side mold.

According to still other exemplary embodiments of the present invention, there is provided a method of assembling a backlight assembly including arranging lamp sockets, inserting lamps into the arranged lamp sockets, and combining the lamp sockets with at least one socket connection portion of a side mold to complete the assembling of the backlight assembly, wherein at least one portion of a bottom surface of the side mold is opened and the side mold has a supporting portion, a side wall formed at one side of the supporting portion, a sloping portion inclined downwardly at a side opposite to the supporting portion, and the at least one socket connection portion receiving the lamp socket.

According to yet other exemplary embodiments of the present invention, there is provided an LCD including an LCD panel displaying an image signal, and a backlight assembly providing the LCD panel with light.

According to other exemplary embodiments of the present invention, there is provided a side mold having at least one portion of a bottom surface thereof opened and including a supporting portion, a side wall formed at one side of the supporting portion, a sloping portion inclined downwardly at a side opposite to the supporting portion, and at least one socket connection portion receiving a lamp socket.

BRIEF DESCRIPTION OF THE DRAWINGS

The above and other features and advantages of the present invention will become more apparent by describing in detail preferred exemplary embodiments thereof with reference to the attached drawings in which.

DETAILED DESCRIPTION OF THE INVENTION

Figure 1:
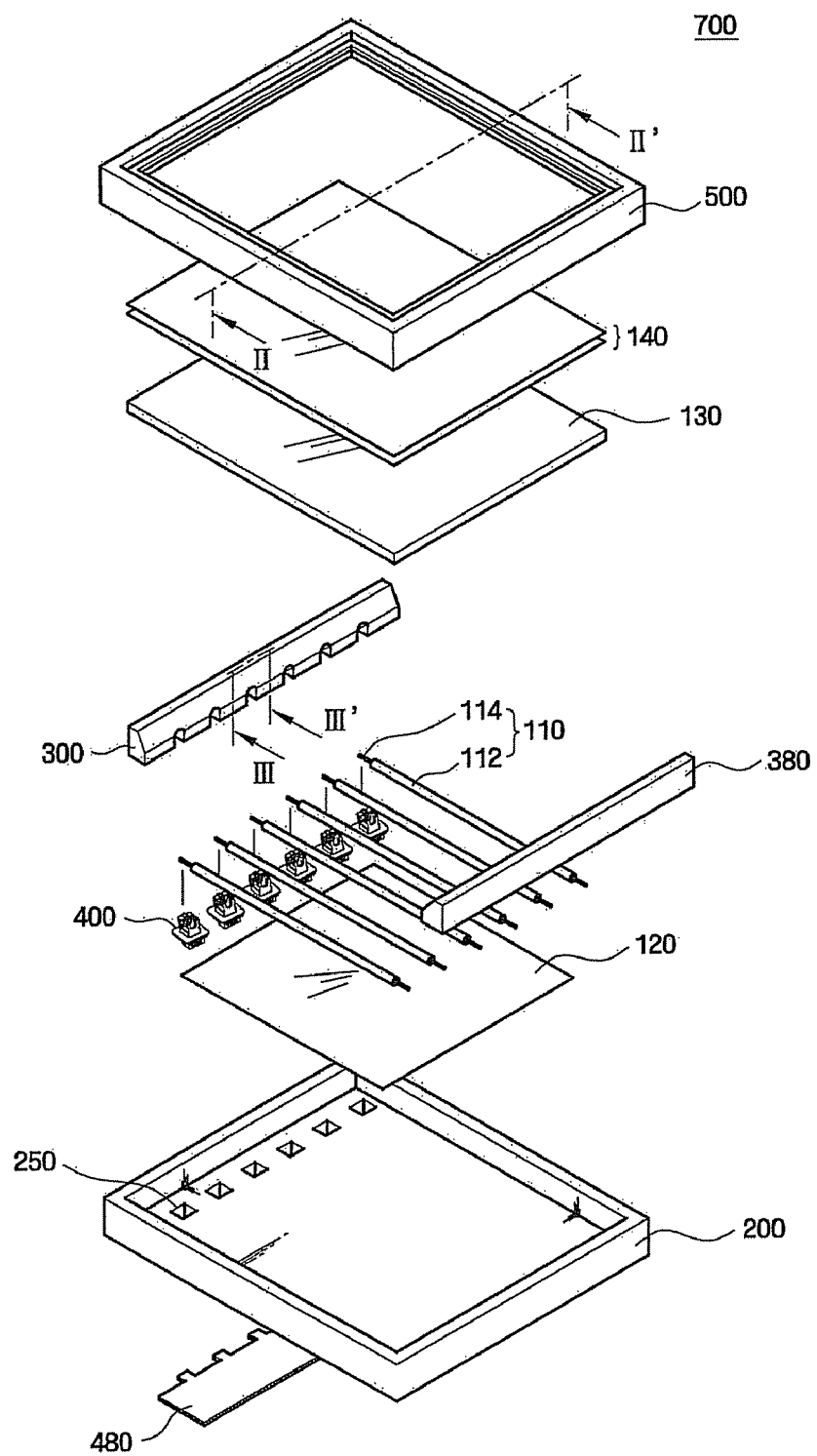
FIG. 1 is an exploded perspective view of an exemplary backlight assembly according to a first exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the following description, it will be understood that when an element or a layer is referred to as being "on" another element or layer, it can be directly on the other element or layer, or intervening layers or elements may also be present. In contrast, when an element is referred to as being "directly on" another element, there are no intervening elements present. Like reference numerals refer to like elements throughout the specification. The terms "and/or" comprises each and at least one combination of referenced items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 2:
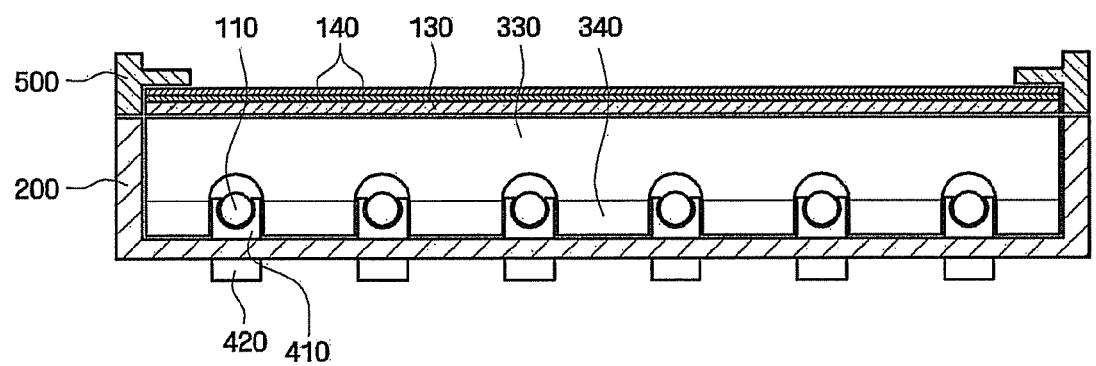
FIG. 2 is a cross-sectional view taken along line II-II' of FIG. 1.
Figure 3:
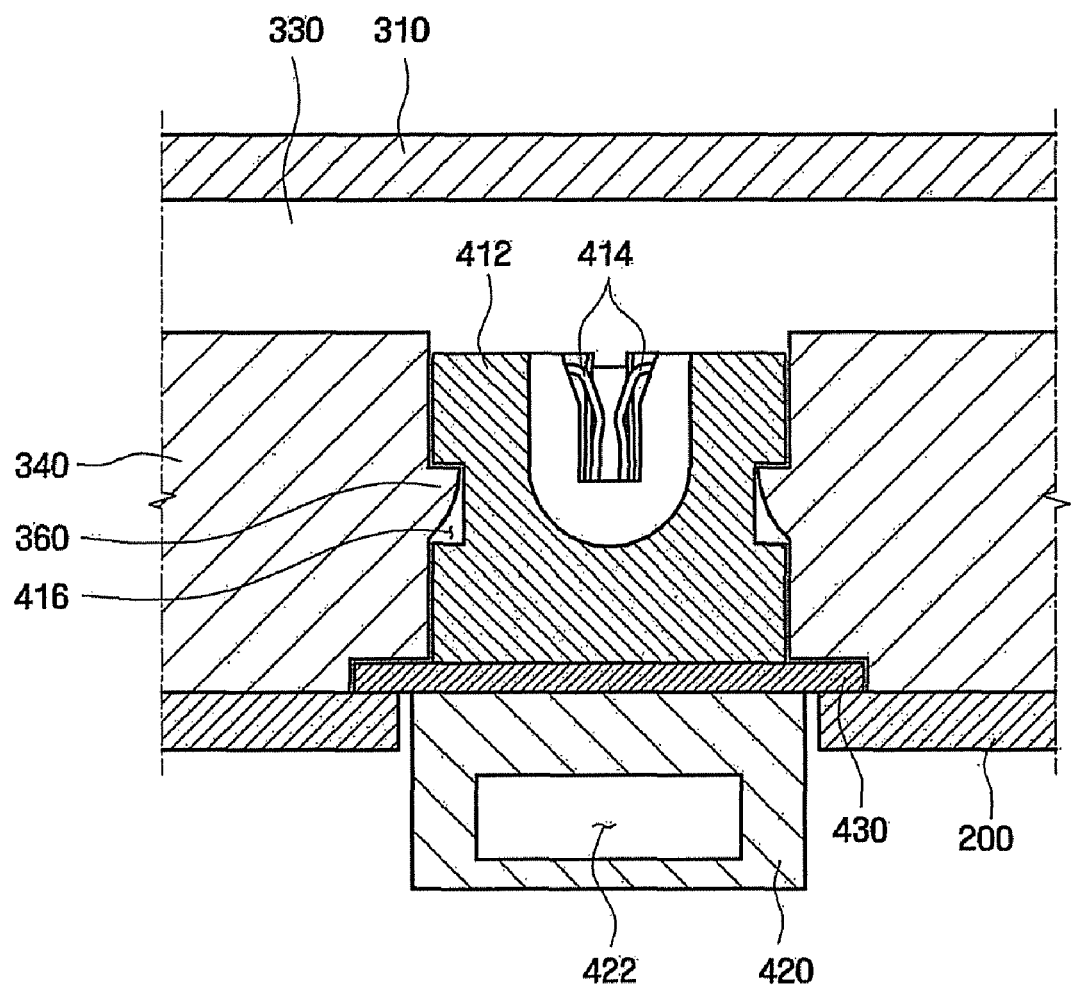
FIG. 3 is a cross-sectional view taken along line III-III' of FIG. 1, partially illustrating the exemplary backlight assembly shown in FIG. 1.

FIG. 1 is an exploded perspective view of an exemplary backlight assembly 700 according to a first exemplary embodiment of the present invention, FIG. 2 is a cross-sectional view taken along line II-II' of FIG. 1, and FIG. 3 is a cross-sectional view taken along line III-III' of FIG. 1, partially illustrating the exemplary backlight assembly shown in FIG. 1.

Referring to FIGS. 1 through 3, the backlight assembly 700 according to a first exemplary embodiment of the present invention includes a plurality of lamps 110, a reflection sheet 120 reflecting light emitted from the lamps 110, an optical plate 130, and an optical sheet layer 140 adjusting optical properties of the emitted light.

Each of the lamps 110 includes a lamp tube 112 and a lead wire 114 extending at either end of the lamp tube 112. Here, the lamp 110 may be, but is not limited thereto, a cold cathode fluorescent lamp ("CCFL"), a hot cathode fluorescent lamp ("HCFL"), an external electrode fluorescent lamp ("EEFL"), and the like.

The reflection sheet 120 is disposed below the lamps 110 and reflects light upward from below the lamps 110.

The optical plate 130 and the optical sheet layer 140 are positioned on the lamps 110. The optical plate 130 diffuses the light incident from the lamps 110 and the optical sheet layer 140 diffuses, polarizes, or focuses the incident light. The optical sheet layer 140 may be formed of a combination of two or more optical sheets having the functions stated previously, for example, a diffusion sheet, a prism sheet, or the like. If necessary, the optical sheet layer 140 may further include a protective sheet.

To accommodate the above-mentioned constituents, that is, the plurality of lamps 110, the reflection sheet 120, the optical plate 130, and the optical sheet layer 140, the backlight assembly 700 may further include a bottom chassis 200, side molds 300 and 380, and a mold frame 500.

The bottom chassis 200 forms the lowermost surface of the backlight assembly 700. The bottom chassis 200 includes a bottom surface and side walls extending angularly, such as perpendicularly, from the bottom surface. Locking holes (not shown) in which hooks of the side molds 300 and 380 are engaged may be provided on the side walls of the bottom chassis 200.

Socket insertion holes 250 into which the lamp sockets 400 are inserted are provided along at least one side of the bottom surface of the bottom chassis 200. Although not shown in the drawing, the socket insertion holes 250 may be provided along both opposite sides of the bottom surface of the bottom chassis 200. The side molds 300 and 380 are received in the opposite sides of the bottom surface of the bottom chassis 200. In the case where the socket insertion holes 250 are provided along opposite sides of the bottom surface of the bottom chassis 200, the side molds 300 and 380 may be substantially the same as each other in their external and internal shape.

In the case where the socket insertion holes 250 are provided along only one side or along each of two opposite sides of the bottom surface of the bottom chassis 200, an inverter PCB 480, which will later be described, may be attached to only one side. In such a case, the external shapes of the side molds 300 and 380 may be substantially the same as each other but the internal shapes thereof may be slightly different from each other. FIG. 1 illustrates that the socket insertion holes 250 are formed along only one side of the bottom surface of the bottom chassis 200. Accordingly, the internal shapes of the side molds 300 and 380 may be slightly different from each other. However, unless otherwise specified, the internal shapes of the side molds which are described in detail in the following examples will be applied to the side mold 300 for insertion of lamp sockets 400.

The reflection sheet 120 is received on the bottom surface of the bottom chassis 200, and the lamps 110 are disposed above the reflection sheet 120. At least one end of each of the lamps 110 is inserted into a lamp socket 400, and each lamp socket 400 is engaged with the side mold 300. The lamp sockets 400 are also inserted into the respective socket insertion holes 250 of the bottom chassis 200 and the inverter PCB 480 is inserted into a protruding portion of the lamp socket 400 inserted into each of the socket insertion holes 250.

The mold frame 500, which has the shape of a frame is disposed above the side molds 300 and 380, and the optical plate 130 and the optical sheet layer 140 are disposed in a receiving space defined between the top surfaces of the side molds 300 and 380 and a protruding portion of the mold frame 500.

Hereinafter, the side mold and lamp sockets of the backlight assembly having the aforementioned configuration will be described in greater detail.

Figure 4:
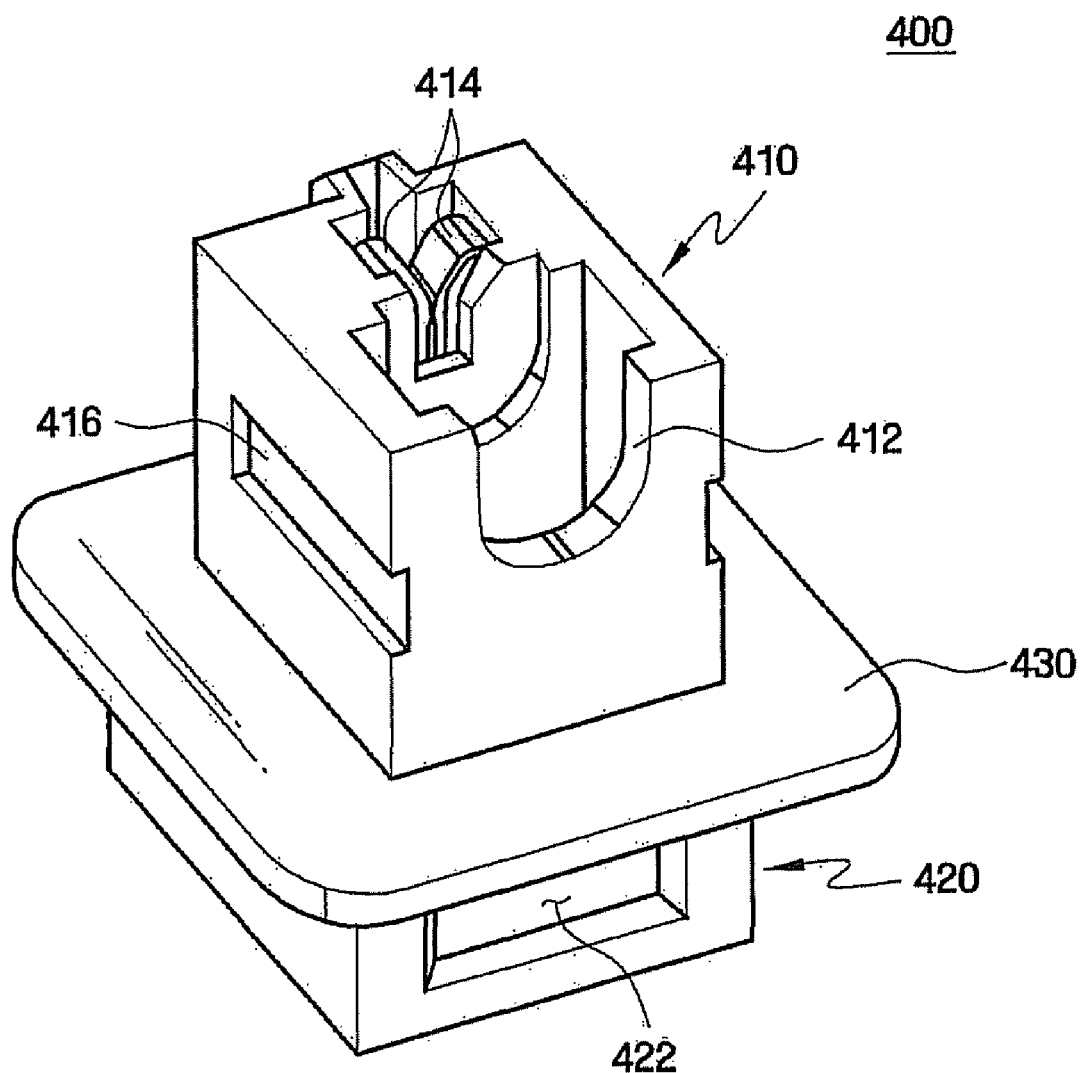
FIG. 4 is a perspective view illustrating an exemplary lamp socket of the exemplary backlight assembly shown in FIG. 1.

FIG. 4 is a perspective view illustrating an exemplary lamp socket 400 of the exemplary backlight assembly shown in FIG. 1.

Referring to FIGS. 1 through 4, the lamp socket 400 includes a lamp connection portion 410 electrically connected to the lamp 110, a power connection portion 420 positioned under the lamp connection portion 410 and electrically connected to a power supply for the lamp 110, and a light blocking plate 430 positioned at an interface between the lamp connection portion 410 and the power connection portion 420.

The lamp connection portion 410 includes a housing made of an insulating material, a locking hole 416 formed on at least one external surface of the housing, a guide groove 412 into which the lamp 110 is inserted, and a pair of lamp connection terminals 414 electrically connected to lead wires 114 of the lamp 110. In a preferred embodiment, the locking hole 416 is formed on both opposing external surfaces of the housing adjacent to the guide groove 412. The pair of lamp connection terminals 414 are convex conductors that are opposite to and face each other, and are electrically connected to and fixed to the lamp 110 by elastically gripping the lead wires 114. For example, the lead wires 114 may be pushed between the lamp connection terminals 414 such that the lead wires 114 are held there between.

The power connection portion 420 has a power connection terminal 422 having a housing made of an insulating material and is electrically connected to the lamp connection terminals 414. The power connection terminal 422 may include an opening on a face of the power connection portion 420, and an electrical conductor provided within a spaced accessed by the opening. In the illustrated embodiment, the opening faces in the same direction as the guide groove 412, however the lamp socket 400 is not limited to the position of the opening shown.

The light blocking plate 430 protrudes outside with respect to the lamp connection portion 410 and the power connection portion 420. In other words, an outermost periphery of the light blocking plate 430 is larger than both an outermost periphery of the lamp connection portion 410 and an outermost periphery of the power connection portion 420.

Figure 5:
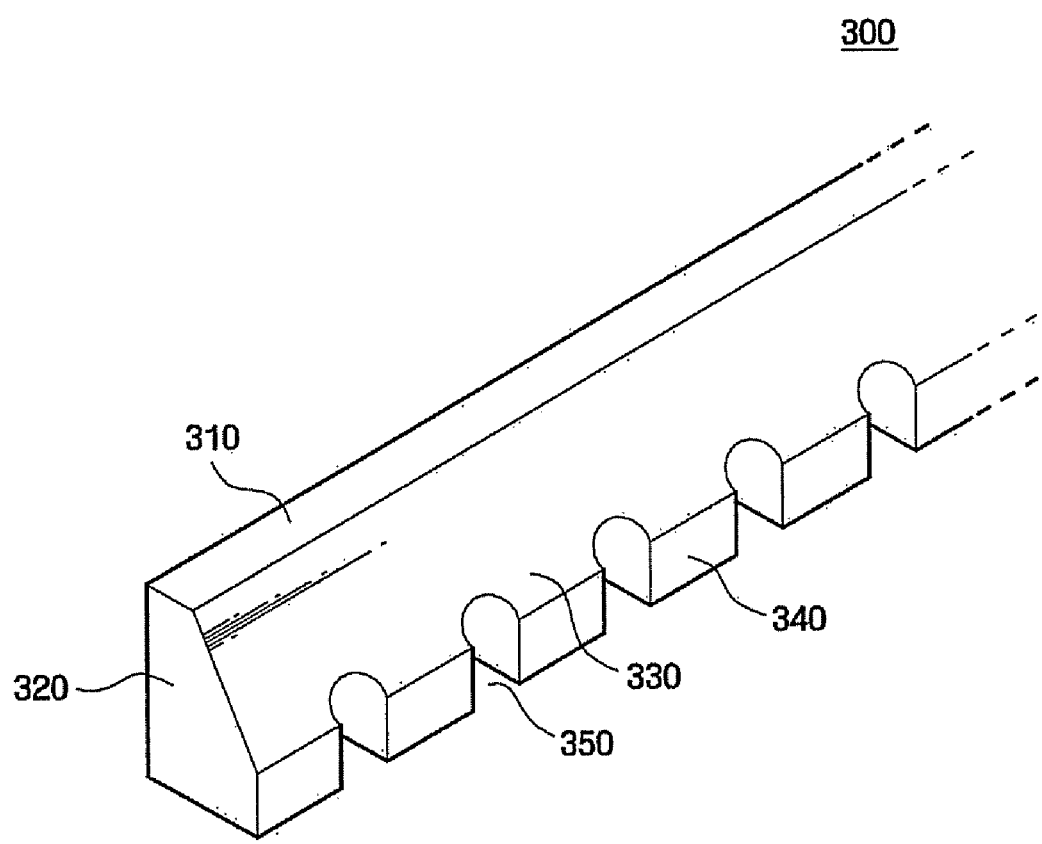
FIG. 5 is a perspective view illustrating an exemplary side mold of the exemplary backlight assembly shown in FIG. 1.
Figure 6:
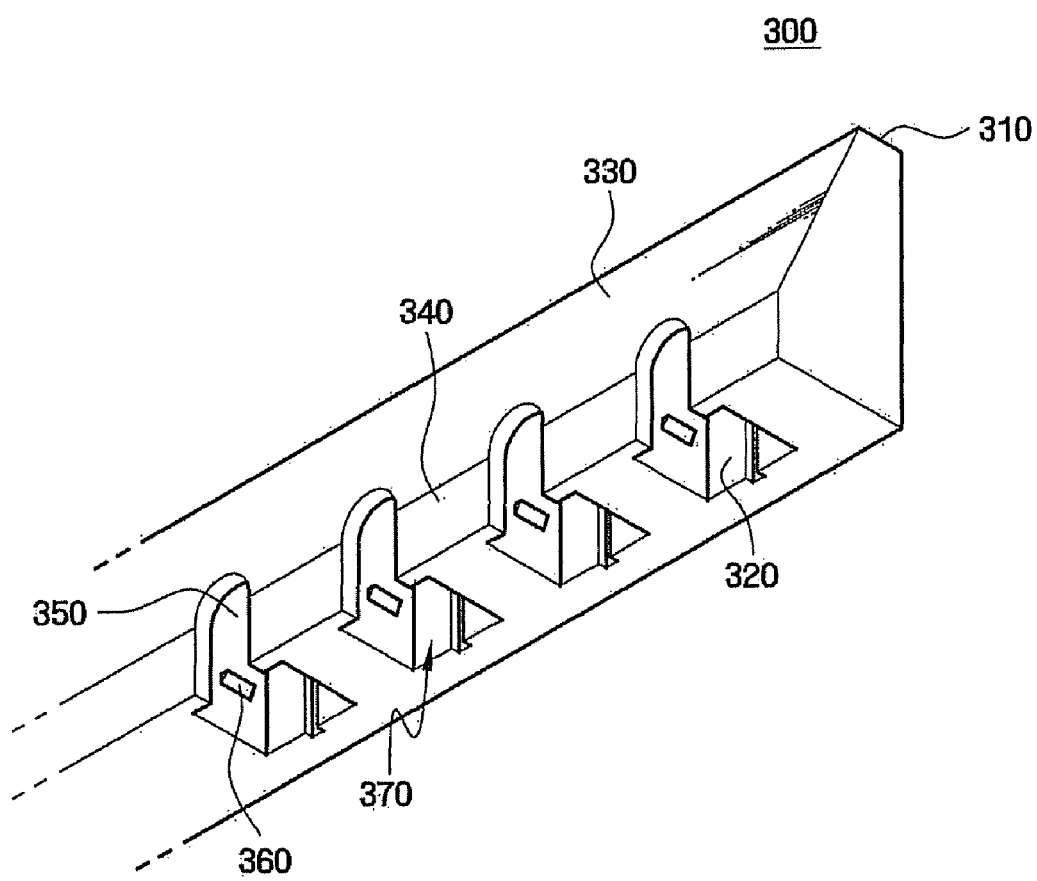
FIG. 6 is a bottom view of the exemplary side mold shown in FIG. 5.

FIG. 5 is a perspective view illustrating an exemplary side mold 300 of the exemplary backlight assembly shown in FIG. 1, and FIG. 6 is a bottom view of the exemplary side mold shown in FIG. 5.

Referring to FIGS. 1 through 6, the side mold 300 includes a supporting portion 310, a side wall 320 formed at one side, or more sides, of the supporting portion 310, a sloping portion 330 inclined downwardly at the side opposite to the supporting portion 310, and a socket coupling unit 370 formed in a space surrounded by the supporting portion 310, the side wall 320, and the sloping portion 330.

The supporting portion 310 of the side mold 300 has a predetermined width and the top surface of the supporting portion 310 supports the optical plate 130 and the optical sheet layer 140 thereon.

The side wall 320 of the side mold 300 extends downwardly from one lateral end of the supporting portion 310 in a longitudinal direction. Here, the one lateral end of the supporting portion 310 is a portion corresponding to an exterior side of the backlight assembly 700 when the side mold 300 is locked into the backlight assembly 700.

In alternative embodiments, the top surface of the side wall 320 may extend from the top surface of the supporting portion 310 so that it may be on a level with the supporting portion 310 without a step difference. In this case, the optical plate 130 and the optical sheet layer 140 may be supported to at least one of the top surface of the supporting portion 310 and the top surface of the side wall 320. In addition, in still other alternative embodiments, the top surface of the side wall 320 may protrude higher than the top surface of the supporting portion 310, and the internal surface of the side wall 320 protruding higher than the top surface of the supporting portion 310 may be used in defining a receiving space.

At least one coupling protrusion (not shown) engaged with the bottom chassis 200 may be provided on an exterior surface of the side wall 320 of the side mold 300. The coupling protrusion may be shaped of a hook, for example. Alternatively, an aperture (not shown) may be formed in the sidewall 320 to couple with a coupling protrusion formed on the bottom chassis 200.

The sloping portion 330 extends from the other lateral end of the supporting portion 310 and the top surface of the sloping portion 330 is inclined downwardly at an angle. Here, the other lateral end of the supporting portion 310 corresponds to an internal side of the backlight assembly 700 when the side mold 300 is locked into the backlight assembly 700. That is to say, the sloping portion 330 is inclined downwardly at an angle with respect to the internal side of the backlight assembly 700.

The downward inclination angle of the sloping portion 330 may be in a range of, but not limited to, about 45 degrees to about 80 degrees based on a horizontal plane, where the horizontal plane may be substantially parallel to the bottom surface of the bottom chassis 200. The bottom end of the sloping portion 330 leads to a covering portion 340. A difference in the downward inclination angle between the sloping portion 330 and the covering portion 340 allows a boundary between the sloping portion 330 and the covering portion 340 to be detected, although the boundary is not clear enough to detect. For example, the downward inclination angle of the covering portion 340 may be greater than that of the sloping portion 330 based on the horizontal plane. In an exemplary embodiment, the downward inclination angle of the covering portion 340 is 90 degrees. When the side mold 300 is engaged with the bottom chassis 200, the bottom end of the covering portion 340 presses on the reflection sheet 120 placed on the bottom surface of the bottom chassis 200, thereby preventing vertical movement of the reflection sheet 120.

At least one lamp recessing hole 350 is formed in the covering portion 340. The at least one lamp recessing hole 350 may extend toward a portion of the sloping portion 330.

Meanwhile, the bottom surface of the side mold 300, including the supporting portion 310, the sloping portion 330, and the covering portion 340, may have at least one plane opened or may have a series of openings sized for receiving the lamp sockets 400. The lamp sockets 400 are received in a space defined by the supporting portion 310, the sloping portion 330, the covering portion 340, and the internal surface of the side wall 320, the space providing for a socket coupling unit 370 to be coupled to each of the lamp sockets 400. The socket coupling unit 370 has a bottom plane opened at the openings on the bottom surface of the side mold 300, and may be shaped to correspond to the lamp connection portion 410 of the lamp socket 400 coupled thereto in a negative pattern.

The socket coupling unit 370 may have four side walls. For example, a first side wall of the socket coupling unit 370 may correspond to an internal surface of the side wall 320 of the side mold 300. A second side wall of the socket coupling unit 370 facing the first side wall is opened by the lamp recessing hole 350. A third side wall adjacent to the first side wall, and a fourth side wall facing the third side wall, may correspond to a lateral surface(s) of the covering portion 340 and/or the sloping portion 330, respectively. The third and fourth side walls may connect the first side wall to the second side wall.

Locking protrusions 360 may be provided on the third and fourth side walls of the socket coupling unit 370 to serve as locking members for connecting with the locking hole 416 of the lamp connection portion 410 of each lamp socket 400. A catching surface of the locking protrusion 360 faces upwardly to catch onto an upper surface of the locking hole 416.

When a surface of the socket coupling unit 370 coming in contact with the top surface of the lamp connection portion 410 is defined as a top surface of the socket coupling unit 370, the top surface of the socket coupling unit 370 may correspond to the bottom surface of the supporting portion 310 of the side mold 300. In a modified embodiment, the top surface of the socket coupling unit 370 may be opened and a hollow space may be provided between the top surface of the socket coupling unit 370 and the bottom surface of the supporting portion 310 of the side mold 300.

Hereinafter, a method of assembling the lamps, the lamp sockets, the side mold and the bottom chassis will be described in more detail.

Figure 7:
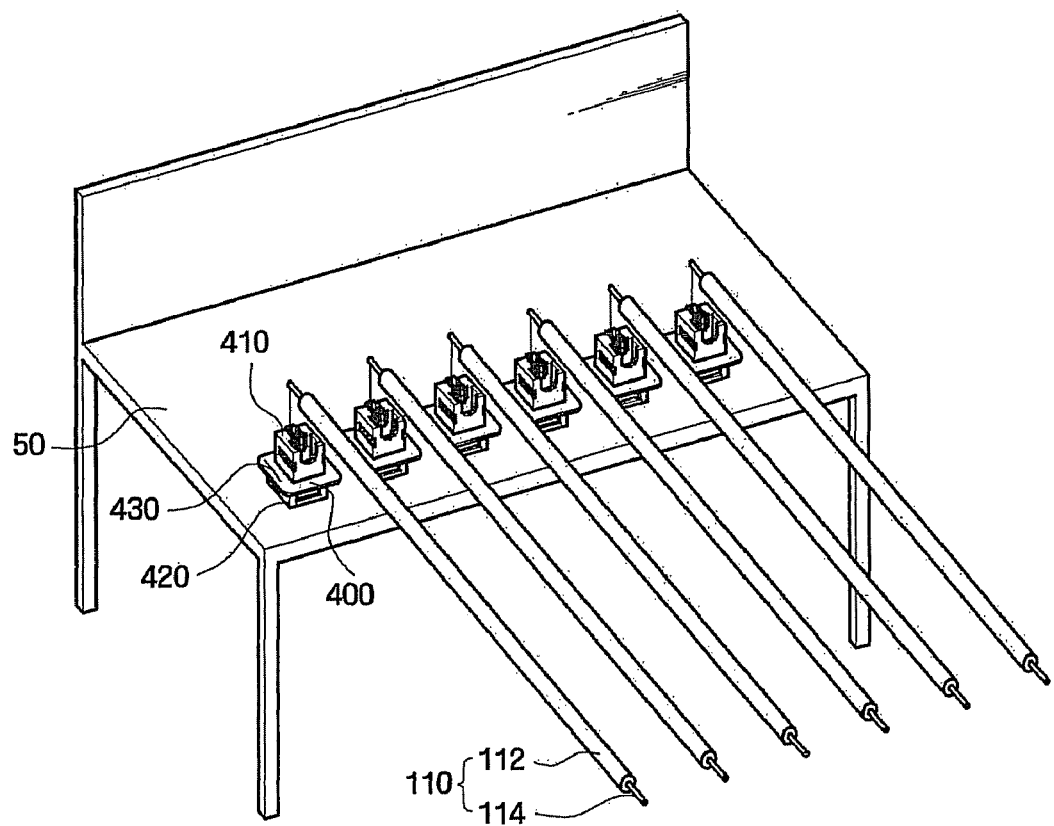
FIGS. 7 through 10 are perspective views illustrating an exemplary method of assembling an exemplary backlight assembly according to an exemplary embodiment of the present invention.
Figure 8:
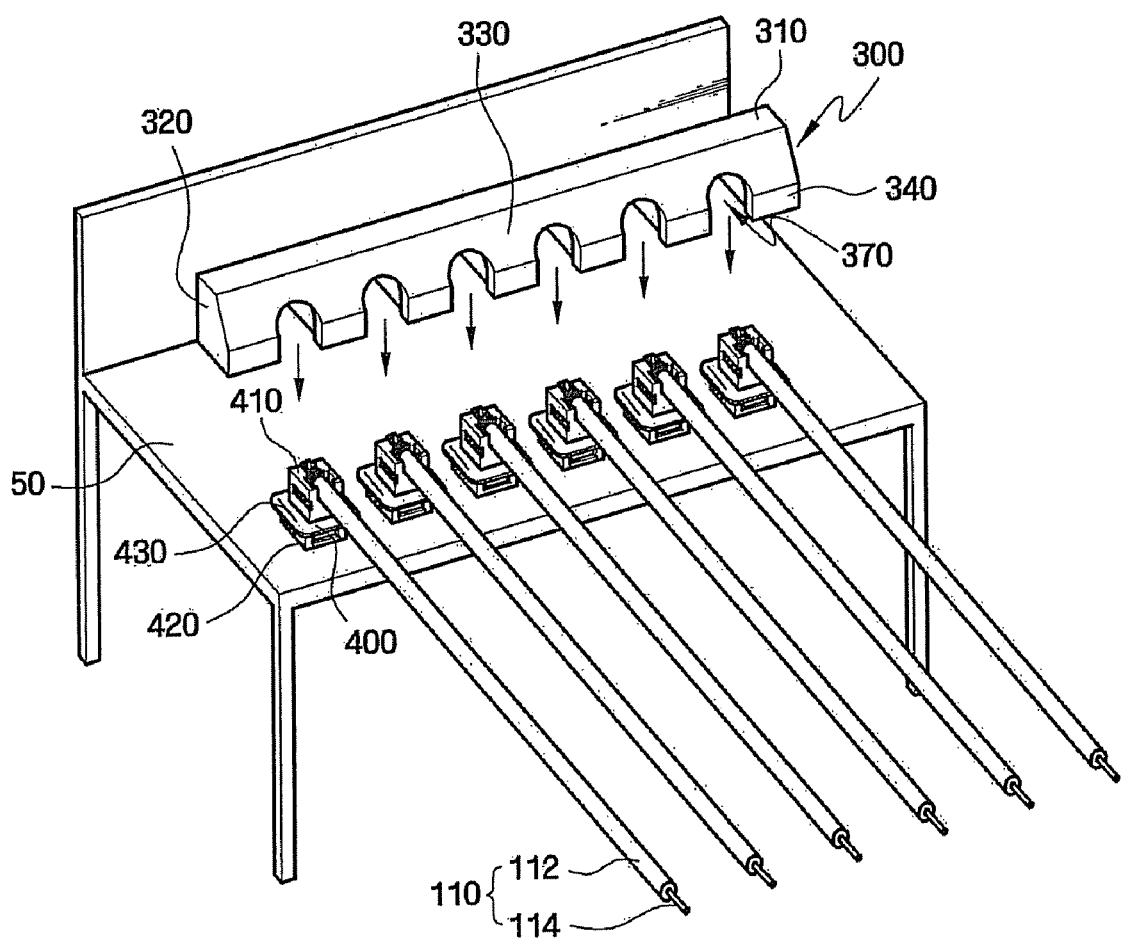
Figure 9:
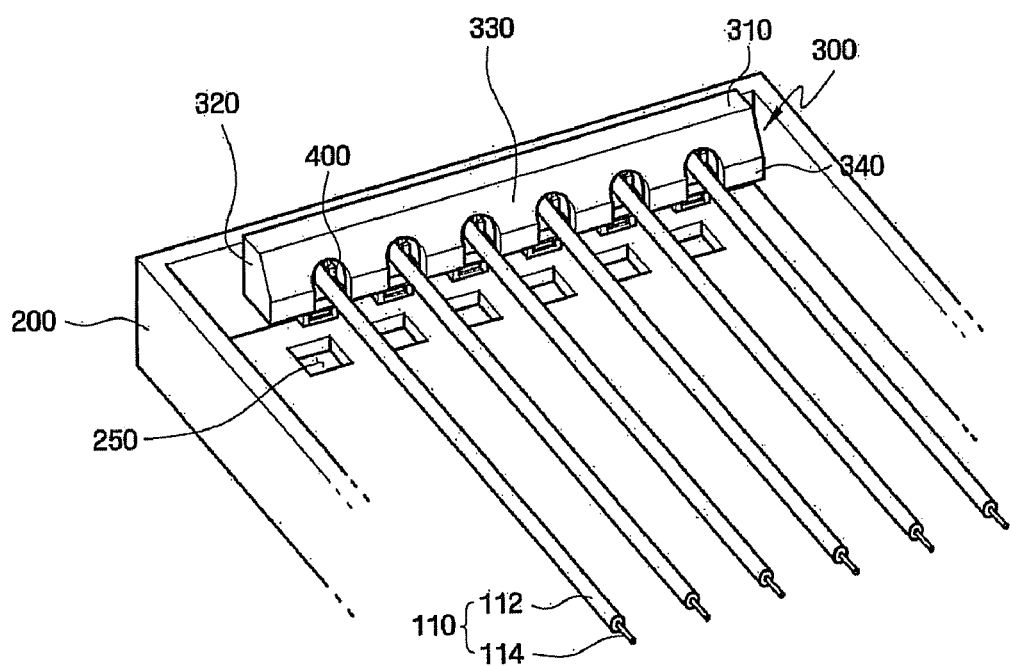
Figure 10:
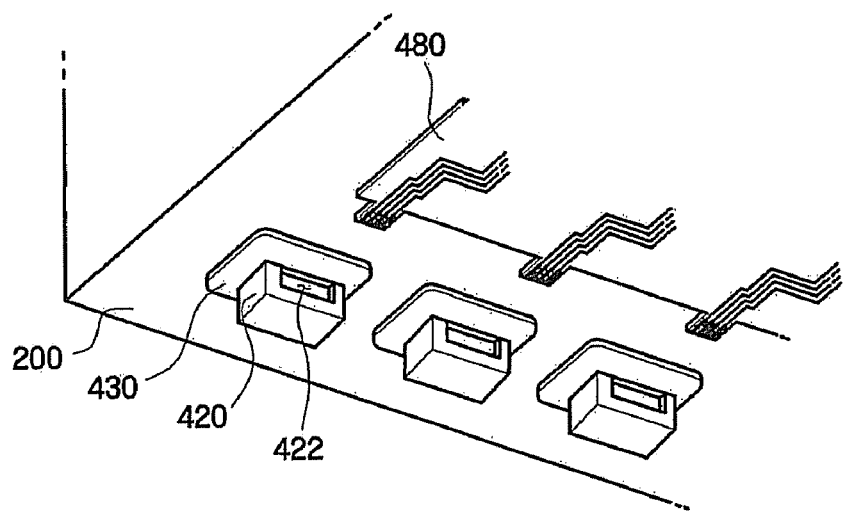

FIGS. 7 through 10 are perspective views illustrating an exemplary method of assembling an exemplary backlight assembly according to an exemplary embodiment of the present invention. Specifically, FIG. 7 is a perspective view illustrating a step of inserting lamps into exemplary lamp sockets, FIG. 8 is a perspective view illustrating a step of combining the exemplary lamp sockets with an exemplary side mold, FIG. 9 is a perspective view illustrating a step of housing the exemplary lamp sockets combined with the exemplary side mold inside an exemplary bottom chassis, and FIG. 10 is a bottom perspective view illustrating a step of plugging an exemplary inverter PCB into a power connection portion of each of the exemplary lamp sockets.

Referring first to FIG. 7, a tray 50 on which the lamp sockets 400 are arranged is prepared. The tray 50 may have alignment grooves (not shown) or markers (not shown) formed thereon to indicate positions of the lamp sockets 400 according to the interval between each of the lamps 110 of the backlight assembly to be assembled. The lamp sockets 400 are arranged on the tray 50 in conformity with the alignment grooves or markers so that the lamp connection portion 410 faces upward and the power connection 420 may contact the tray 50.

Next, the lamp 110 is inserted into the lamp connection portion 410 of the lamp socket 400. In particular, the lamp 110 is pressurized in a downward direction of the lamp socket 400 so that a lamp tube 112 is received in the guide groove 412, as shown in FIG. 3, and a lead wire 114 is gripped by a pair of facing conductors of lamp connection terminals 414, as shown in FIG. 3.

Referring to FIG. 8, the lamp socket 400 coupled to the lamp 110 is combined with the side mold 300. For example, if the side mold 300 is disposed on the lamp socket 400 arranged on the tray 50 and then pressurized downwardly, the lamp socket 400 is received into the socket coupling unit 370 of the side mold 300 through the opened bottom surface of the socket coupling unit 370. Here, the lamp 110 inserted into the lamp connection portion 410 of the lamp socket 400 is received into the lamp recessing hole 350 of the side mold 300. If the side mold 300 is further pressurized downwardly, locking protrusions 360, provided on the third and fourth side walls of the socket coupling unit 370, are combined with locking holes 416 of the lamp socket 400, as shown in FIG. 3. The locking protrusion 360 may be provided with a catch that enters the locking hole 416 such that the lamp socket 400 cannot be inadvertently displaced or removed from the side mold 300. Additionally, the light blocking plate 430 may prevent the lamp socket 400 from being overly inserted within the side mold 300 by directly abutting with a bottom surface of the side mold 300, or, alternatively, the bottom surface of the side mold 300 may include an indent sized to receive the light blocking plate 430. Accordingly, the lamp socket 400 can be securely mounted inside or combined with the side mold 300. In this stage, since a plurality of lamp sockets 400 are arranged in a predetermined interval, they can be combined with the side mold 300 accurately and simultaneously. In addition, since the lamp socket 400 is directly combined with the side mold 300 without additional components, movement of the lamp socket 400 can be prevented, the assembling process can be simplified, and the manufacturing cost can be reduced due to the reduced number of components.

Next, referring to FIG. 9, a complex body including the side mold 300, the lamp sockets 400, and the lamps 110 is disposed on the bottom chassis 200. That is, the complex body including the side mold 300, the lamp sockets 400, and the lamps 110 is disposed at one side of the bottom chassis 200 such that the power connection portion 420 of the lamp socket 400 is inserted into the socket insertion holes 250 of the bottom chassis 200. Here, the light blocking plate 430 of the lamp socket 400 is locked on the bottom surface of the bottom chassis 200 in the vicinity of the socket insertion holes 250, thereby preventing the lamp socket 400 from being overly inserted in a rearward direction of the bottom chassis 200 and preventing light leakage from being generated at the lamp connection portion 410. In addition, the side mold 300 is combined with the bottom chassis 200 by, for example, a hook connection method between a coupling protrusion (not shown) formed on one of the external surface of the side wall 320 or the side wall of the bottom chassis 200 and a coupling hole (not shown) formed on the other of the external surface of the side wall 320 or the side wall of the bottom chassis 200.

Referring to FIG. 10, the inverter PCB 480 is inserted into the power connection terminal 422 provided in the power connection portion 420 of the lamp socket 400 protruding rearward with respect to the bottom chassis 200. The inverter PCB 480 may include protrusions sized for receipt within each power connection terminal 422. As described above in FIG. 4, the power connection terminal 422 is electrically connected to the lamp connection terminal 414 of the lamp connection portion 410 and the lead wire 114 of the lamp 110 is connected to the lamp connection terminal 414. Accordingly, when the inverter PCB 480 is inserted into the power connection terminal 422, the lamp 110 is electrically connected to the inverter PCB 480. In addition, insertion of the inverter PCB 480 into the power connection terminal 422 further increases the effect of preventing upward movement of the lamp socket 400 and the side mold 300 connected therewith.

Next, an optical plate 130 and an optical sheet layer 140 are disposed on the supporting portion 310 of the side mold 300, and then covered by a mold frame 500, thereby completing the backlight assembly 700 shown in FIGS. 2 and 3.

Hereinafter, a backlight assembly according to another embodiment of the present invention will be described. In the following embodiment, in a case where the structures are the same as or can be easily understood from those of the first or previous embodiment(s), overlapping descriptions will be omitted or simplified.

Figure 11:
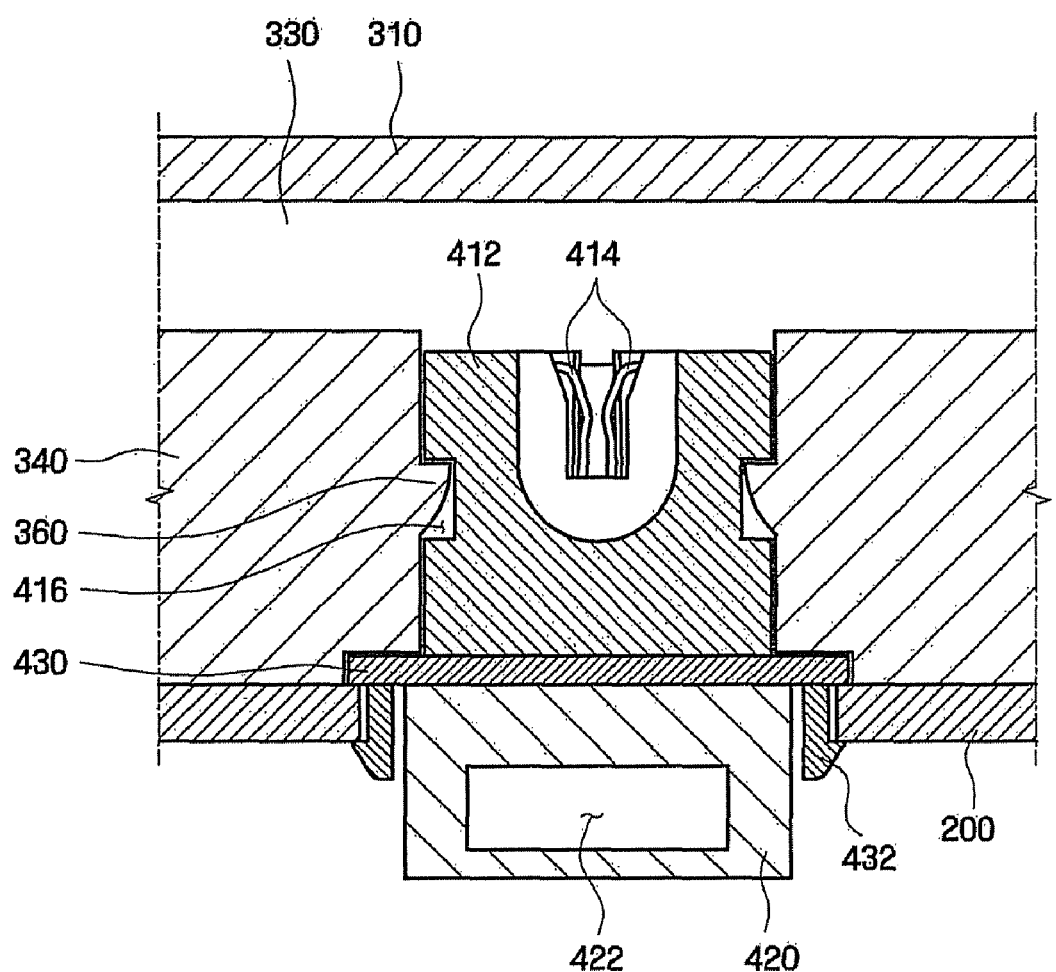
FIG. 11 is a cross-sectional view partially illustrating an exemplary backlight assembly according to a second exemplary embodiment of the present invention.
Figure 12:
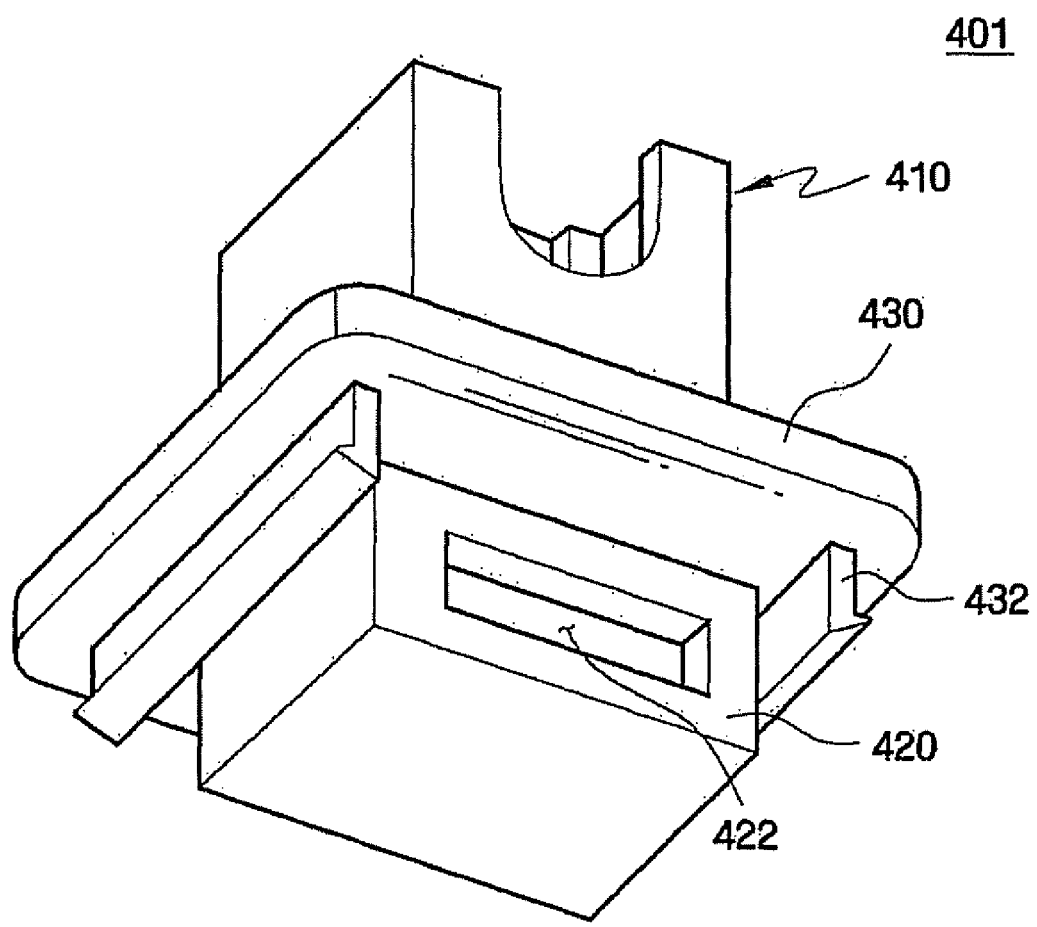
FIG. 12 is a bottom perspective view illustrating an exemplary lamp socket shown in FIG. 11.

FIG. 11 is a cross-sectional view partially illustrating an exemplary backlight assembly according to a second exemplary embodiment of the present invention and FIG. 12 is a bottom perspective view illustrating an exemplary lamp socket shown in FIG. 11.

Referring to FIGS. 11 and 12, the exemplary backlight assembly of the current embodiment is different from the exemplary backlight assembly of the first exemplary embodiment in that a lamp socket 401 is combined with a socket insertion hole 250 of a bottom chassis 200 by a hook connection method.

In more detail, a locking fastener 432 is formed on the rear surface of a light blocking plate 430 of the lamp socket 401. The locking fastener 432 may be formed in the vicinity of both side walls of a housing of a power connection portion 420 which are opposite to each other in view of a power connection terminal 422. The locking fastener 432 may be a hook-shaped locking protrusion with a guiding surface for guiding the lamp socket 401 into the socket insertion hole 250, and a catch for retaining the lamp socket 401 in the socket insertion hole 250.

With this structure, when the lamp socket 401 is inserted into the socket insertion hole 250 of the bottom chassis 200 in a state in which the lamp socket 401 is combined with a socket coupling unit 370 of a side mold 300, locking of the locking fastener 432 on the rear surface of the bottom chassis 200 in the vicinity of the socket insertion hole 250 further increases the effect of preventing movement of the lamp socket 401 with respect to the bottom chassis 200 and the side mold 300. Accordingly, the backlight assembly can be securely assembled.

Figure 13:
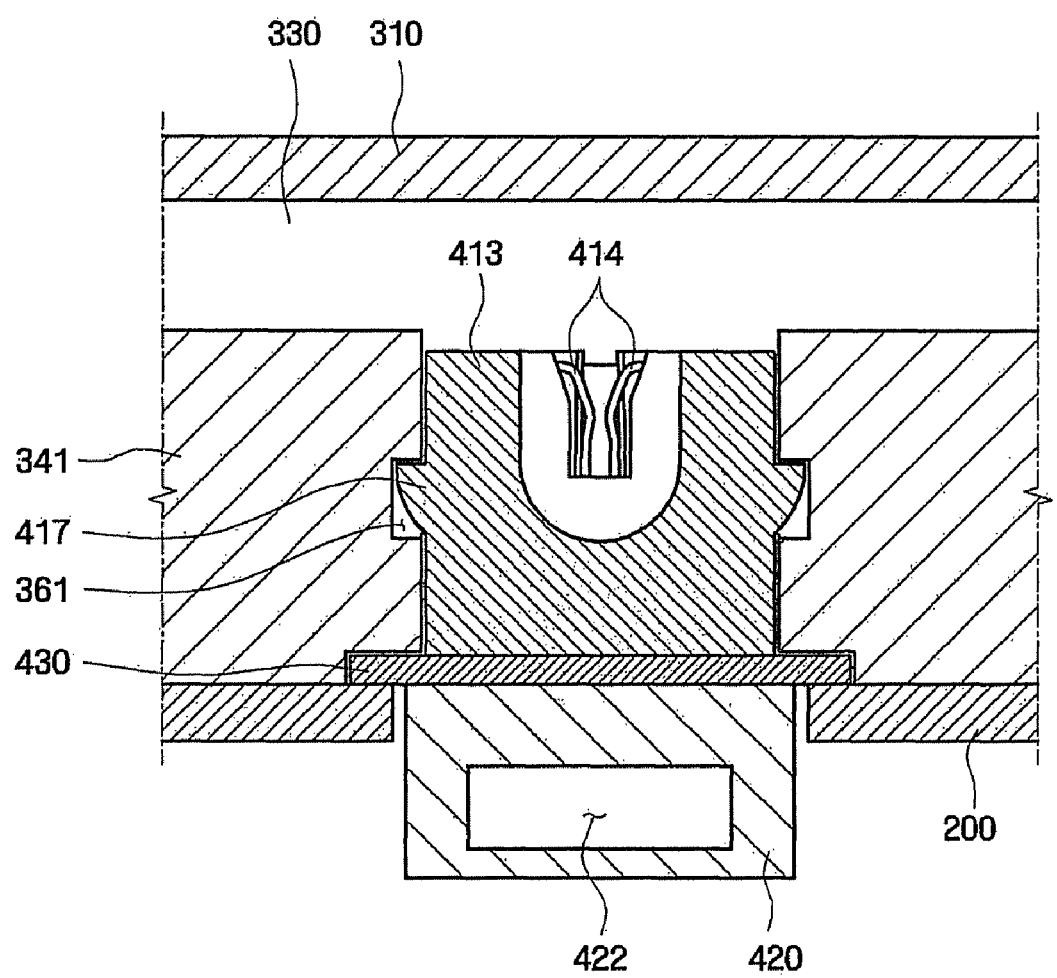
FIG. 13 is a cross-sectional view partially illustrating an exemplary backlight assembly according to a third exemplary embodiment of the present invention.
Figure 14:
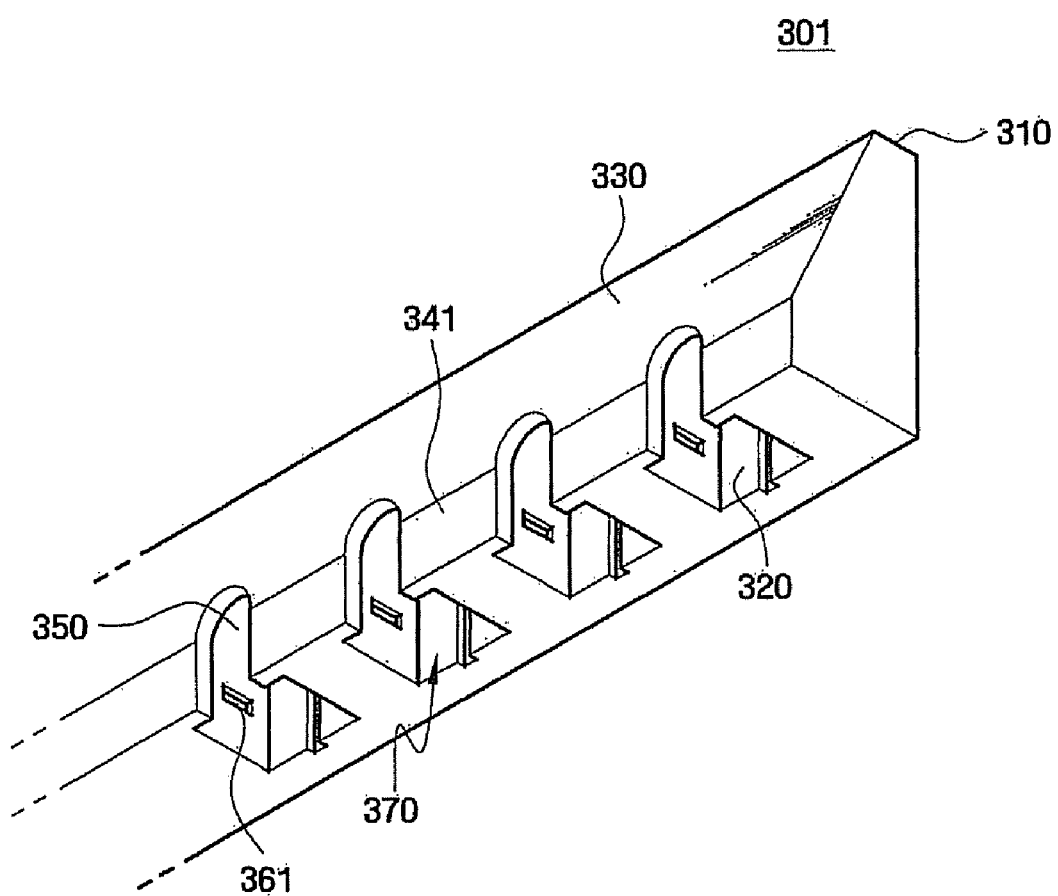
FIG. 14 is a bottom perspective view illustrating an exemplary side mold shown in FIG. 13.
Figure 15:
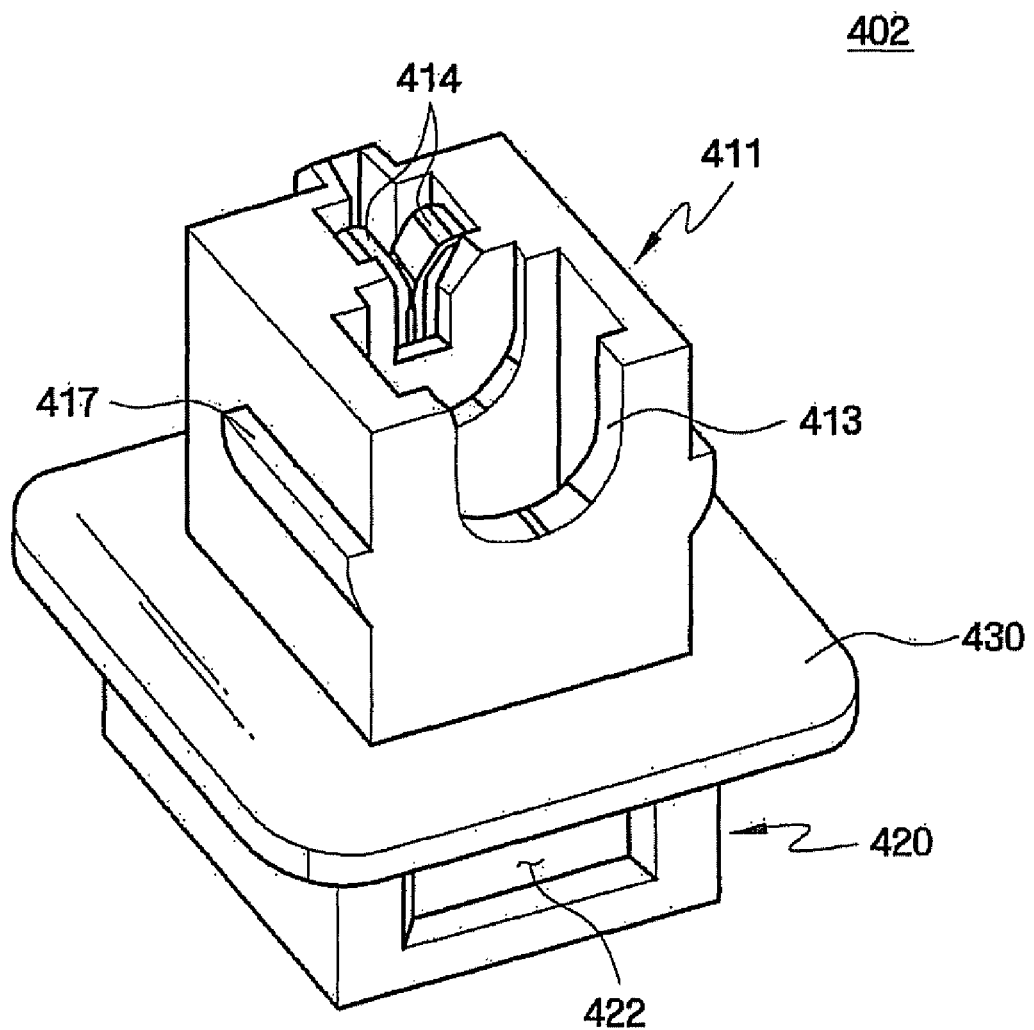
FIG. 15 is a perspective view illustrating an exemplary lamp socket shown in FIG. 13.

FIG. 13 is a cross-sectional view partially illustrating an exemplary backlight assembly according to a third exemplary embodiment of the present invention, FIG. 14 is a bottom perspective view illustrating an exemplary side mold shown in FIG. 13, and FIG. 15 is a perspective view illustrating an exemplary lamp socket shown in FIG. 13.

Referring to FIGS. 13 through 15, the exemplary backlight assembly of the current exemplary embodiment is different from the exemplary backlight assembly of the first exemplary embodiment in that a locking hole 361 is formed on a side mold 301 behind covering portion 341 and a locking protrusion 417 is formed in a lamp socket 402 adjacent guide groove 413.

That is to say, as shown in FIG. 14, the locking hole 361, rather than a locking protrusion, is formed on each of the third and fourth side walls of a socket connection portion 370 provided in the side mold 301. Referring to FIG. 15, the locking protrusion 417, rather than a locking hole, is formed on the external surfaces of a housing of a lamp connection portion 411 in the lamp socket 402. A catching surface of the locking protrusion 417 faces upwardly to catch onto an upper surface of the locking hole 361. The engagement of the locking hole 361 and the locking protrusion 417 allows the lamp socket 402 to be securely combined with or housed in the side mold 301.

While the current exemplary embodiment has been illustrated such that the locking protrusion 417 is formed on both opposite surfaces of the housing of the lamp socket 402, the invention is not limited thereto and the locking protrusion 417 may be formed instead on the light blocking plate 430.

Figure 16:
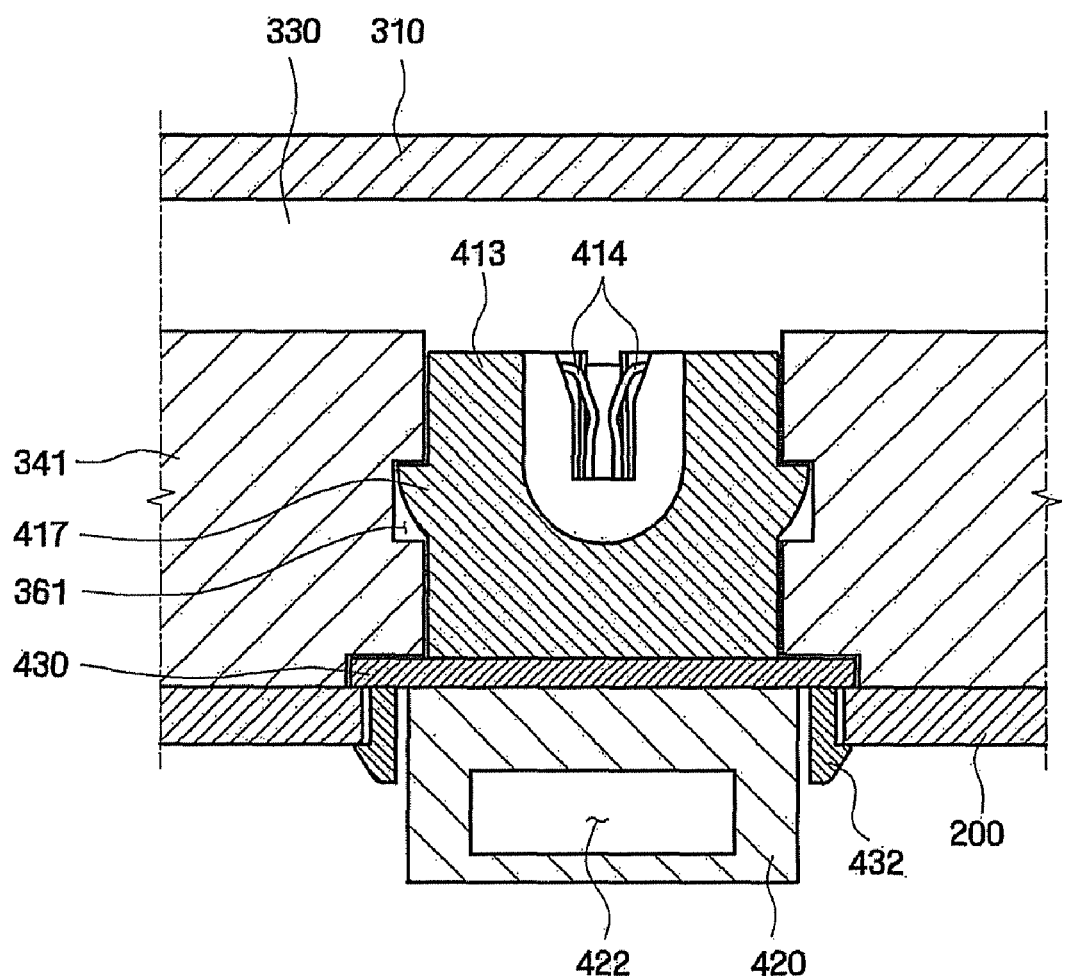
FIG. 16 is a cross-sectional view partially illustrating an exemplary backlight assembly according to a fourth exemplary embodiment of the present invention.

FIG. 16 is a cross-sectional view partially illustrating an exemplary backlight assembly according to a fourth exemplary embodiment of the present invention as a combination example of the second and third exemplary embodiments. That is, whereas the configuration of the exemplary backlight assembly of the current exemplary embodiment is substantially the same as that of the exemplary backlight assembly of the third exemplary embodiment, the backlight assembly of the current exemplary embodiment is different from the exemplary backlight assembly of the third exemplary embodiment in that a locking fastener 432 is provided on the bottom surface of the light blocking plate 430. Like in the previous embodiments, the exemplary backlight assembly according to the current exemplary embodiment can also be securely assembled because the locking fastener 432 locked on the bottom surface of a bottom chassis 200 in the vicinity of a socket insertion hole 250 further increases the effect of preventing movement of a lamp socket.

Figure 17:
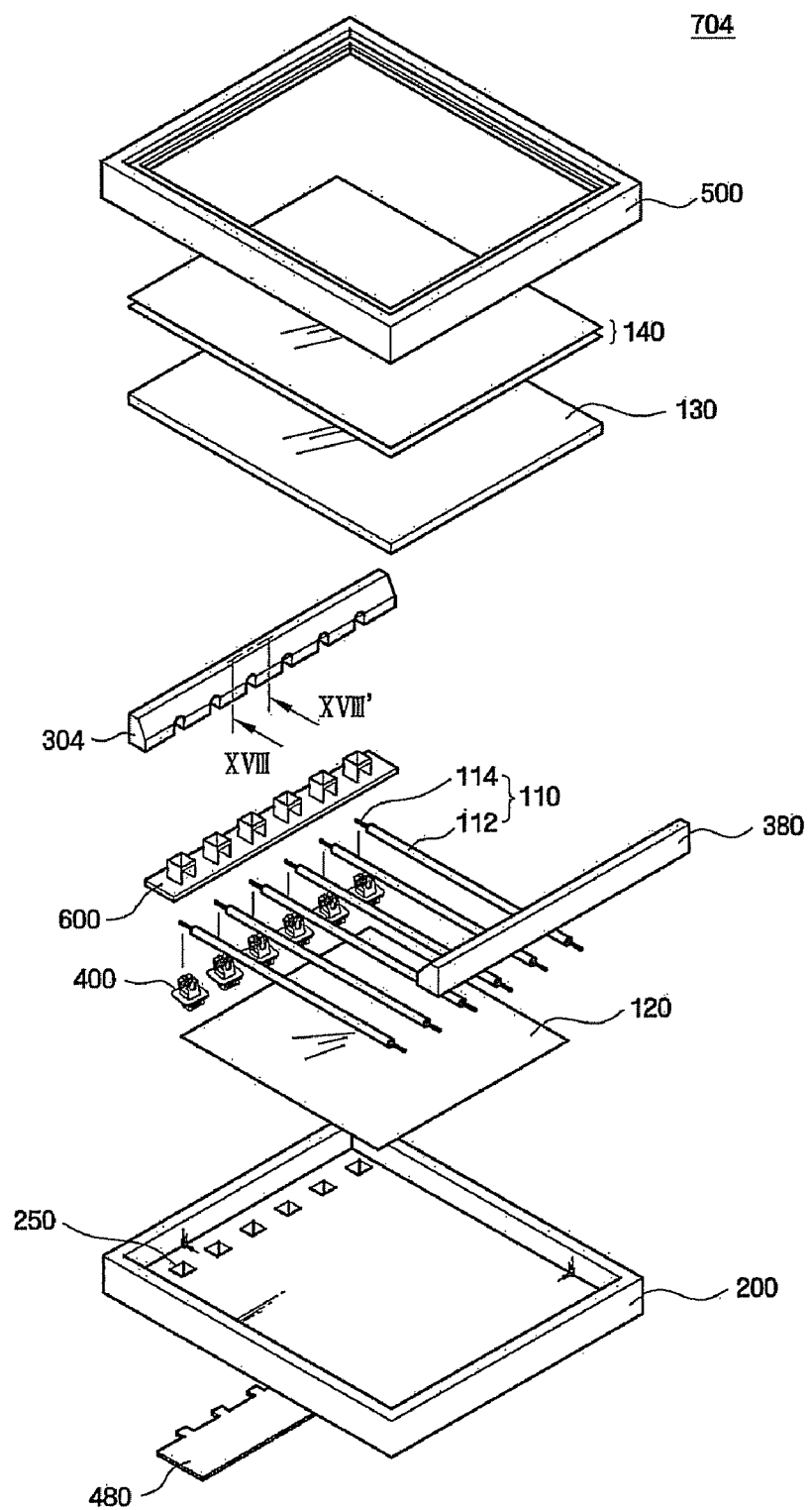
FIG. 17 is an exploded perspective view illustrating an exemplary backlight assembly according to a fifth exemplary embodiment of the present invention.
Figure 18:
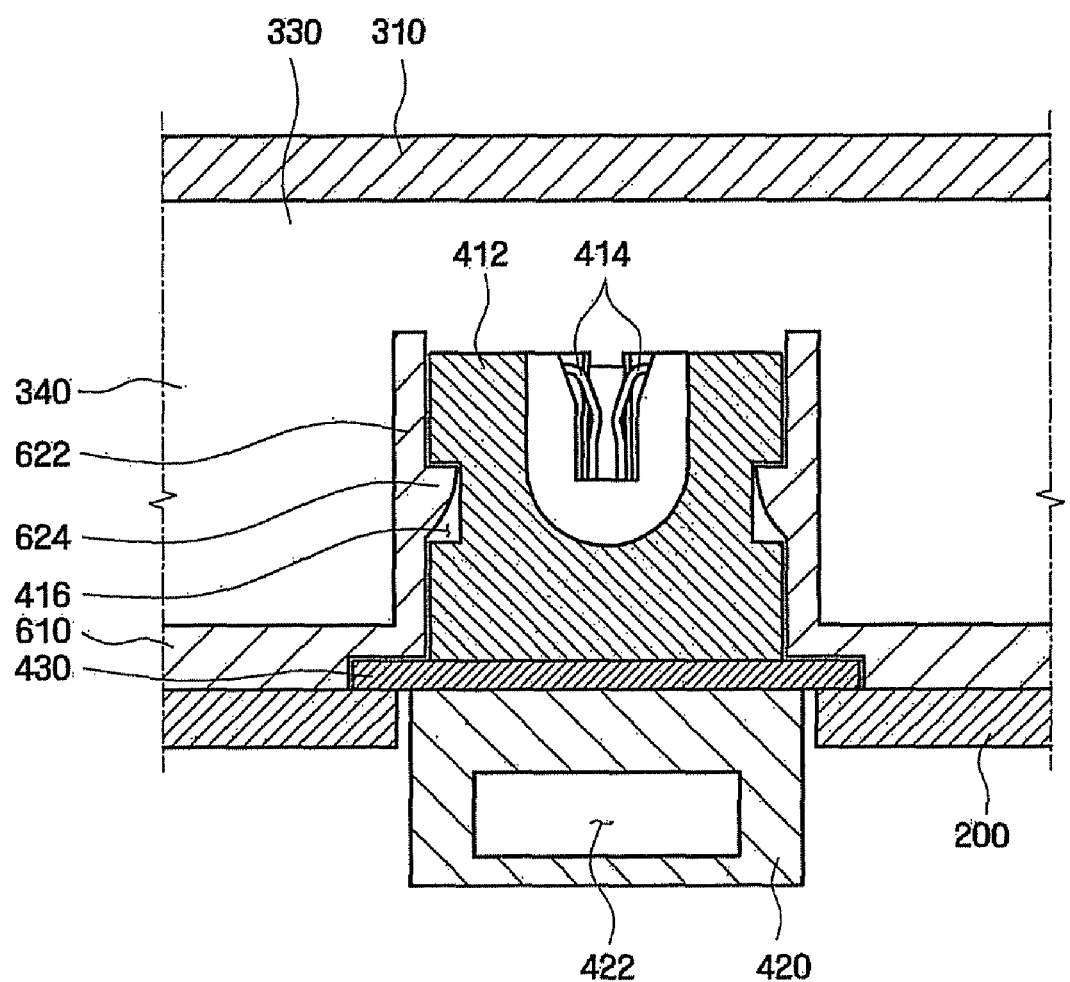
FIG. 18 is a cross-sectional view taken along line XVIII-XVIII' of FIG. 17.
Figure 19:
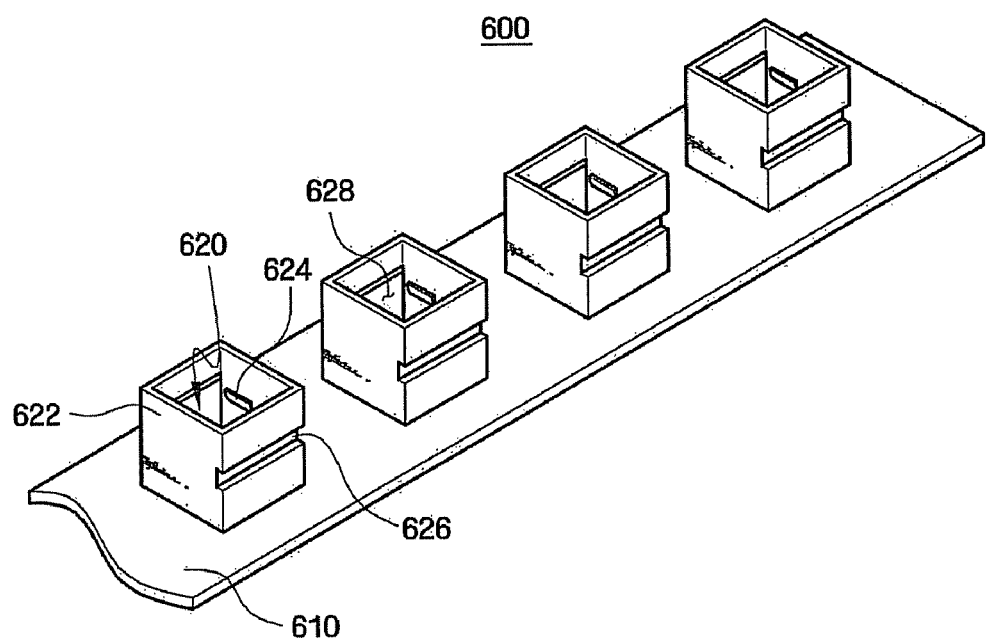
FIG. 19 is a perspective view illustrating an exemplary socket connection plate shown in FIG. 17.
Figure 20:
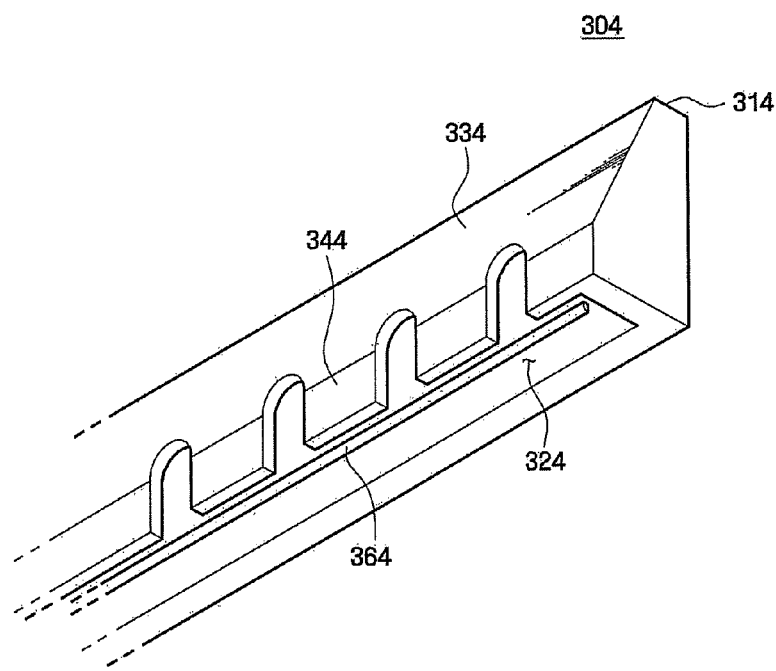
FIG. 20 is a bottom perspective view illustrating an exemplary side mold shown in FIG. 17.

FIG. 17 is an exploded perspective view illustrating an exemplary backlight assembly 704 according to a fifth exemplary embodiment of the present invention, FIG. 18 is a cross-sectional view taken along line XVIII-XVIII' of FIG. 17, FIG. 19 is a perspective view illustrating an exemplary socket connection plate shown in FIG. 17, and FIG. 20 is a bottom perspective view illustrating an exemplary side mold shown in FIG. 17.

Referring to FIGS. 17 and 18, the backlight assembly 704 of the current exemplary embodiment is different from the exemplary backlight assembly of the first exemplary embodiment in that a side mold 304 has a socket connection plate 600 separately provided therein while having no socket connection portion formed therein.

Referring to FIG. 19, the socket connection plate 600 includes a support plate 610 extending in one direction, and at least one socket connection portion 620 formed on the support plate 610. The at least one socket connection portion 620 protrudes from the support plate 610 and has a bottom plane opened. In addition, at least one lateral surface of the socket connection portion 620 includes a support wall 622. Here, at least one of both lateral surfaces of the socket connection portion 620 which are parallel with the elongation direction of the support plate 610 provides for a lamp recessing hole 628 that is opened to a predetermined height from its bottom surface. At least one locking protrusion 624 used for connection with the locking hole 416 of the lamp socket 400 is formed on the internal surface of the support wall 622. Alternatively, the locking protrusion 624 may be replaced by a locking hole, and the locking hole 416 may be replaced by a locking protrusion.

At least one locking member used for connection with a side mold 304 may be provided at two opposite ends of the support plate 610 in the elongation direction of the support plate 610 or on the external surface of the socket connection portion 620. For example, FIG. 19 shows an example of the locking member, that is, a locking hole 626 formed on the support wall 622 of the socket connection portion 620, which is parallel with the elongation direction of the support plate 610.

Referring to FIG. 20, the side mold 304 includes a side wall 324, a support unit 314, a sloping portion 334, and a cover 344. Here, the bottom surface of these components, that is, the internal surface of the side mold 304 is opened, and a space surrounded by these components provides for a connection space of the socket connection plate 600. In addition, at least one locking member is provided on either the internal surface of the side wall 324 or the internal surface of the sloping portion 334. For example, FIG. 20 shows an example of the locking member, that is, a locking protrusion 364 formed on the side wall 324.

Referring again to FIGS. 17 and 18, the lamp socket 400 is inserted into and combined with the socket connection portion 620 of the socket connection plate 600. The secured connection between the lamp socket 400 and the socket connection plate 600 is attributable to the locking hole 416 of the lamp socket 400 and the locking protrusion 624 of the socket connection plate 600. The socket connection plate 600 having the lamp socket 400 secured therein is inserted into an internal open space of the side mold 304, via the opened bottom of the side mold 304, to then be combined with the side mold 304. In this case, the locking protrusion 364 of the side mold 304 is engaged with the locking hole 626 of the socket connection plate 600, thereby achieving a more secured connection between the socket connection plate 600 and the side mold 304, and thus maintaining the lamp socket 400 within the side mold 304.

Now, the assembling sequence will be described. First, the lamp 110 is inserted into the lamp socket 400 and the lamp socket 400 is then combined with the socket connection plate 600. Next, the socket connection plate 600 is combined with the side mold 304.

Alternatively, in another non-limiting example of the method of assembling the present invention, the lamp socket 400 may first be combined with the socket connection plate 600 and the lamp 110 may then be inserted into the lamp socket 400. Alternatively, in yet another exemplary method of assembling the present invention, the socket connection plate 600 may first be combined with the side mold 304, followed by combining the lamp socket 400 with the socket connection plate 600.

While the current embodiment has illustrated that the backlight assembly has a separate socket connection plate mounted thereon without the socket connection portion of the side mold of the first exemplary embodiment, the invention is not limited to the illustrated backlight assembly and it is obvious that the invention may be applied to the backlight assemblies according to the second through fourth exemplary embodiments.

Figure 21:
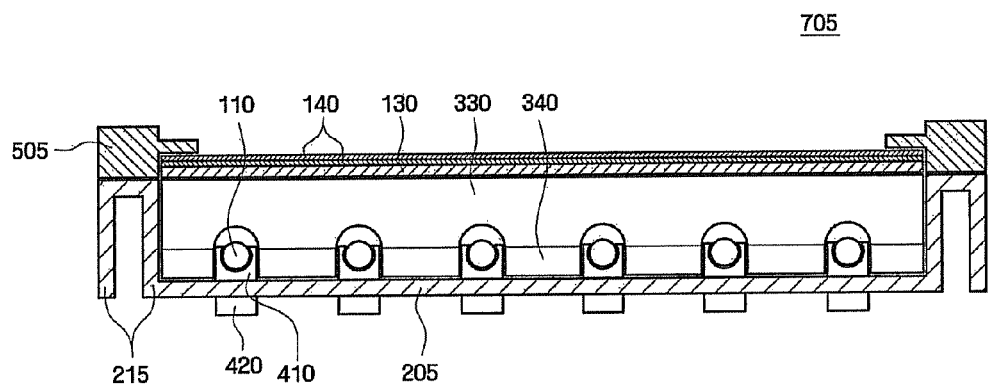
FIG. 21 is a cross-sectional view illustrating an exemplary backlight assembly according to a sixth exemplary embodiment of the present invention.

FIG. 21 is a cross-sectional view illustrating a backlight assembly 705 according to a sixth exemplary embodiment of the present invention. Referring to FIG. 21, the backlight assembly 705 of the current exemplary embodiment is different from the backlight assembly of the first exemplary embodiment in that a bottom chassis 205 has a U-shaped side wall 215. Such a U-shape of the side wall 215 of the bottom chassis 205 may extend a width of a mold frame 505 disposed thereon.

According to this exemplary embodiment, the U-shape of the side wall 215 of the bottom chassis 205 absorbs external impacts applied to the backlight assembly 705, thereby protecting internal structural components of the backlight assembly 705. It will be apparent to those skilled in the art that the U-shape of the side wall 215 of the bottom chassis 205 can be applied to the backlight assemblies according to the previously described embodiments.

Next, a liquid crystal display ("LCD") including the exemplary backlight assembly according to an exemplary embodiment of the present invention will be described.

Figure 22:
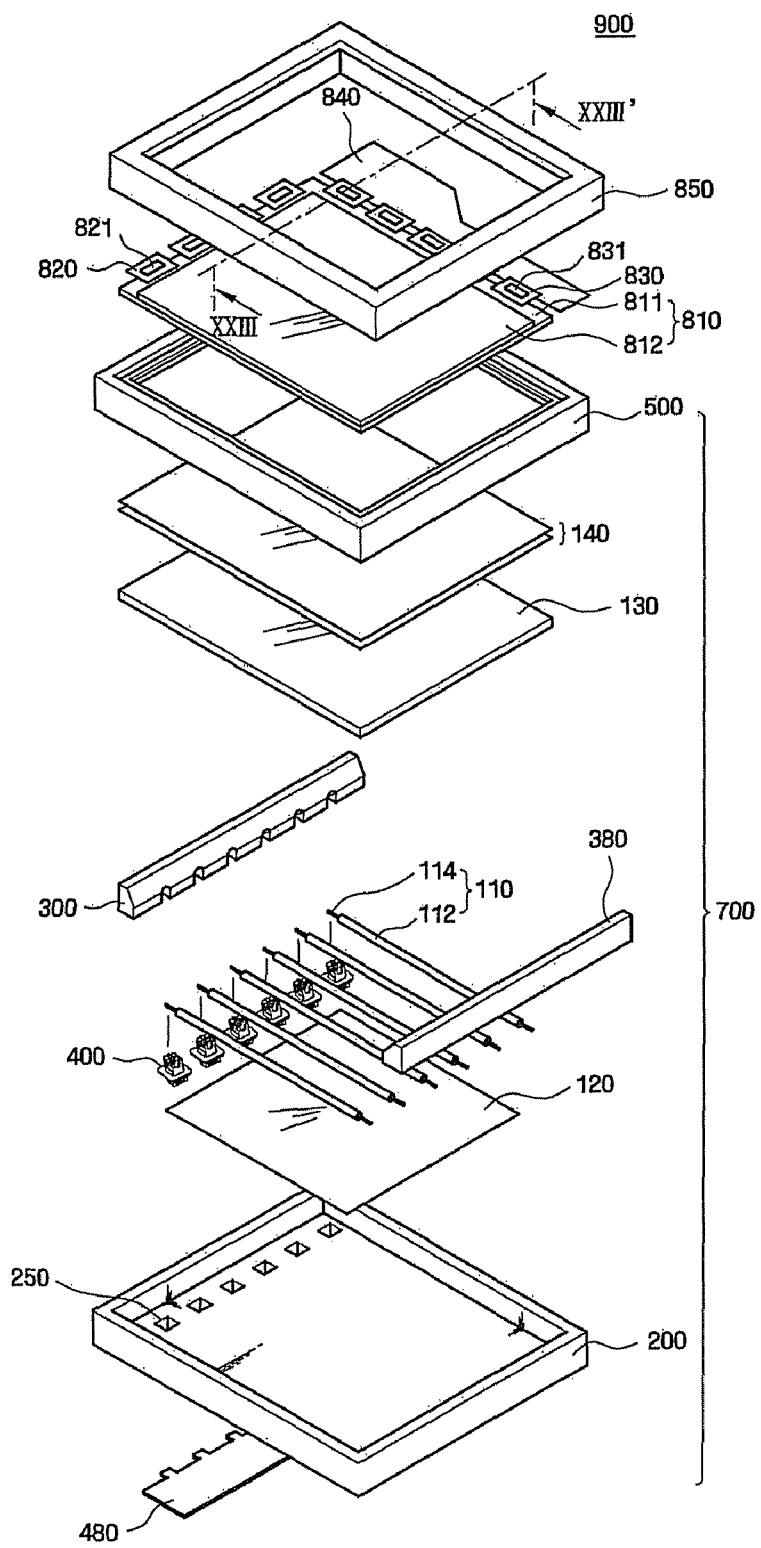
FIG. 22 is an exploded perspective view illustrating an exemplary liquid crystal display ("LCD") according to an exemplary embodiment of the present invention.
Figure 23:
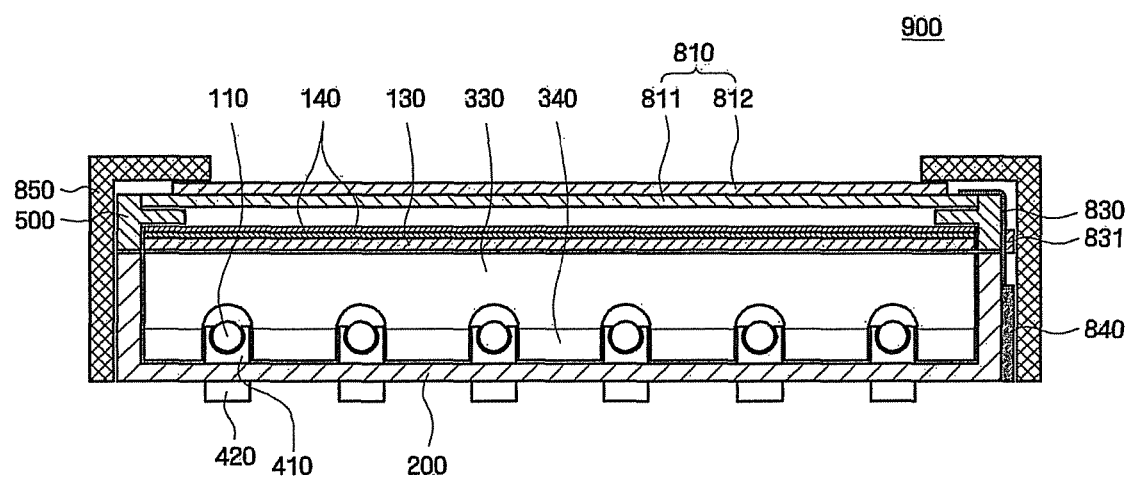
FIG. 23 is a cross-sectional view taken along line XXIII-XXIII' of FIG. 22.

FIG. 22 is an exploded perspective view illustrating an exemplary LCD 900 according to an exemplary embodiment of the present invention, and FIG. 23 is a cross-sectional view taken along line XXIII-XXIII' of FIG. 22.

Referring to FIGS. 22 and 23, the LCD 900 of this embodiment includes an LCD assembly, a backlight assembly 700, and a top chassis 850. Here, the backlight assembly 700 is the same as the backlight assembly according to the first exemplary embodiment of the present invention and thus any further detailed descriptions thereof will be omitted.

The LCD assembly includes an LCD panel 810, a data tape carrier package ("TCP") 830 attached to one side of the LCD panel 810, and a printed circuit board ("PCB") 840 attached to the data TCP 830. The LCD panel 810 includes a first substrate 811, a second substrate 812, and a liquid crystal layer (not shown) formed between the first substrate 811 and the second substrate 812. A data driver integrated circuit ("IC") 831 is mounted on the data TCP 830. In addition, a gate TCP 820 is attached to a side of the LCD panel 810 adjacent to the side having the data TCP 830 attached thereto. A gate driver IC 821 is mounted on the gate TCP 820.

The top chassis 850 covers the edges of the LCD panel 810 and surrounds lateral surfaces of the LCD panel 810 and the backlight assembly 700. The gate TCP 820, the data TCP 830, and the PCB 840 are bent, providing for a receiving space between the side walls of the bottom chassis 200 and the side walls of the top chassis 850, thereby receiving the top chassis 850 therein. The top chassis 850 may be combined with the bottom chassis 200 and a mold frame 500 by, but not limited to, a hook or screw connection method.

While the LCD according to the current exemplary embodiment including the backlight assembly according to the first exemplary embodiment has been illustrated by way of example, the invention is not limited to the illustrated example and it is to be understood that the illustrated LCD may include the backlight assemblies according to the second through sixth embodiments of the present invention.

According to the backlight assemblies of the exemplary embodiments of the present invention, a plurality of lamp sockets can be combined with a side mold accurately and simultaneously. In addition, since the lamp sockets are directly combined with the side mold without additional components, movement of the lamp sockets can be prevented, the assembling process can be simplified, and the manufacturing cost can be reduced due to the reduced number of components.

While the present invention has been particularly shown and described with reference to the exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A backlight assembly comprising:
   a lamp emitting light;
   a lamp socket into which the lamp is inserted; and
   a side mold having at least one portion of a bottom surface thereof opened, the side mold comprising a supporting portion, a side wall formed at one side of the supporting portion, a sloping portion inclined downwardly at a side opposite to the supporting portion, and at least one socket connection portion receiving the lamp socket,
   wherein the lamp socket includes a lamp connection portion, a power connection portion, and a light blocking plate positioned at an interface between the lamp connection portion and the power connection portion,
   wherein the lamp connection portion, the power connection portion, and the light blocking plate, are integrally formed with each other as a single unitary indivisible unit, and
   wherein the light blocking plate protrudes outward from the power connection portion.

2. The backlight assembly of claim 1, wherein each of the at least one socket connection portion includes an internal surface of the side wall and a lateral surface of the sloping portion.

3. The backlight assembly of claim 2, wherein the lateral surface of the sloping portion included in each socket connection portion comprises a first locking member, the lamp socket comprises a second locking member coupled to the first locking member, and the lamp socket is combined with the side mold as the first locking member and the second locking member are coupled to each other.

4. The backlight assembly of claim 3, wherein the first locking member is a locking protrusion and the second locking member is a locking hole.

5. The backlight assembly of claim 3, wherein the first locking member is a locking hole and the second locking member is a locking protrusion.

6. The backlight assembly of claim 2, wherein the side mold further comprises a covering portion extending downwardly from a lower end of the sloping portion, and at least one lamp recessing hole into which the lamp is inserted is formed in at least one of the covering portion and the sloping portion.

7. The backlight assembly of claim 6, further comprising a bottom chassis receiving the side mold and having a socket insertion hole in a bottom surface of the bottom chassis,
   wherein the lamp socket is inserted into the socket insertion hole so that the lamp connection portion and the light blocking plate are disposed above the bottom surface of the bottom chassis and the power connection portion is disposed below the bottom surface of the bottom chassis, and
   wherein the lamp is inserted into the lamp connection portion and the power connection portion is connected to an inverter printed circuit board providing power to the lamp.

8. The backlight assembly of claim 7, wherein a locking protrusion is formed on a rear surface of the light blocking plate and the locking protrusion is locked on the bottom chassis in a vicinity of the socket insertion hole.

9. A method of assembling a backlight assembly, the method comprising:
   arranging lamp sockets;
   inserting lamps into the arranged lamp sockets; and
   combining the lamp sockets with at least one socket connection portion of a side mold to complete the assembling of the backlight assembly, wherein at least one portion of a bottom surface of the side mold is opened and the side mold has a supporting portion, a side wall formed at one side of the supporting portion, a sloping portion inclined downwardly at a side opposite to the supporting portion, and the at least one socket connection portion receiving the lamp socket,
   wherein the lamp socket includes a lamp connection portion, a power connection portion, and a light blocking plate positioned at an interface between the lamp connection portion and the power connection portion,
   wherein the lamp connection portion, the power connection portion, and the light blocking plate are integrally formed with each other as a single unitary indivisible unit, and
   wherein the light blocking plate protrudes outward from the power connection portion.

10. A liquid crystal display comprising:
    a liquid crystal display panel displaying an image signal; and
    a backlight assembly providing the liquid crystal display panel with light, the backlight assembly including:
    a lamp emitting light;
    a lamp socket into which the lamp is inserted;
    a side mold having at least one portion of a bottom surface thereof opened, the side mold comprising a supporting portion, a side wall formed at one side of the supporting portion, a sloping portion inclined downwardly at a side opposite to the supporting portion; and, at least one socket connection portion receiving a lamp socket, wherein the lamp socket includes a lamp connection portion, a power connection portion, and a light blocking plate positioned at an interface between the lamp connection portion and the power connection portion, wherein the lamp connection portion, the power connection portion, and the light blocking plate are integrally formed with each other as a single unitary indivisible unit, and wherein the light blocking plate protrudes outward from the power connection portion.

11. The liquid crystal display of claim 10, wherein the at least one socket connection portion is formed integrally within the side mold.

12. The liquid crystal display of claim 10, wherein the at least one socket connection portion is formed on a socket connection plate, and the socket connection plate is combined with the side mold.

13. A side mold having at least one portion of a bottom surface thereof opened and the side mold comprising:
a supporting portion;
a side wall formed at one side of the supporting portion;
a sloping portion inclined downwardly at a side opposite to the supporting portion; and
at least one socket connection portion receiving a lamp socket, wherein the lamp socket includes a lamp connection portion, a power connection portion, and a light blocking plate positioned at an interface between the lamp connection portion and the power connection portion, wherein the lamp connection portion, the power connection portion, and the light blocking plate are integrally formed with each other as a single unitary indivisible unit, and wherein the light blocking plate protrudes outward from the power connection portion.

14. The side mold of claim 13, wherein each of the at least one socket connection portion includes an internal surface of the side wall and a lateral surface of the sloping portion.

15. The side mold of claim 14, wherein the lateral surface of the sloping portion included in the at least one socket connection portion comprises a locking protrusion or a locking hole engaging with the lamp socket.

16. The side mold of claim 14, further comprising a covering portion extending downwardly from a lower end of the sloping portion, wherein at least one lamp recessing hole into which a lamp is inserted is formed in at least one of the covering portion and the sloping portion.

* * * * *